(12) United States Patent
Guo et al.

(10) Patent No.: US 9,203,098 B2
(45) Date of Patent: Dec. 1, 2015

(54) ORGANIC VAPOR FUEL CELL

(75) Inventors: Jiusheng Guo, Centerville, OH (US);
Aruna Zhamu, Centerville, OH (US);
Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 591 days.

(21) Appl. No.: 11/257,528

(22) Filed: Oct. 26, 2005

(65) Prior Publication Data

US 2007/0092773 A1    Apr. 26, 2007

(51) Int. Cl.
*H01M 8/10* (2006.01)
*H01M 8/04* (2006.01)

(52) U.S. Cl.
CPC ...... *H01M 8/04089* (2013.01); *H01M 8/04007* (2013.01); *H01M 8/04186* (2013.01); *H01M 8/04261* (2013.01); *H01M 8/1002* (2013.01); *H01M 8/1004* (2013.01); *H01M 8/1011* (2013.01); *H01M 8/04037* (2013.01); *H01M 8/04194* (2013.01); *H01M 8/1013* (2013.01); *H01M 2250/20* (2013.01); *H01M 2250/30* (2013.01); *Y02B 90/18* (2013.01); *Y02E 60/523* (2013.01); *Y02T 90/32* (2013.01)

(58) Field of Classification Search
CPC .......................... H01M 8/1011; H01M 8/1013
See application file for complete search history.

(56) References Cited

U.S. PATENT DOCUMENTS

| | | | |
|---|---|---|---|
| 4,016,129 A | 4/1977 | Miyosawa | |
| 4,279,752 A | 7/1981 | Sueoka et al. | |
| 5,783,324 A | 7/1998 | Binder et al. | |
| 6,127,058 A | 10/2000 | Pratt et al. | |
| 6,248,460 B1 | 6/2001 | Surampudi et al. | |
| 6,322,917 B1 * | 11/2001 | Acker | 429/412 |
| 6,418,275 B1 * | 7/2002 | Yang | 392/441 |
| 6,447,941 B1 * | 9/2002 | Tomimatsu et al. | 429/452 |
| 6,811,905 B1 | 11/2004 | Cropley et al. | |
| 2004/0146769 A1 * | 7/2004 | Birschbach | 429/34 |
| 2004/0209136 A1 * | 10/2004 | Ren et al. | 429/30 |
| 2004/0265680 A1 * | 12/2004 | Ren et al. | 429/44 |
| 2005/0164059 A1 * | 7/2005 | Yang et al. | 429/26 |
| 2005/0186455 A1 * | 8/2005 | Kaye et al. | 429/17 |

OTHER PUBLICATIONS

J. Kallo, et al. "Conductance and Mehtanol Crossover Investigation of Nafion membranes in a Vapor-Fed DMFC," J. of the Electrochemical Soc., 150 (6) (2003) pp. A765-A-769.

* cited by examiner

*Primary Examiner* — Maria J Laios

(57) ABSTRACT

A fuel cell including primarily (a) a membrane electrode assembly, which comprises (i) a proton exchange membrane having a front face and a rear face, (ii) an anode being coupled to the front face, and (iii) a cathode being coupled to the rear face; (b) a fuel permeation-controlling member positioned in front of the anode; the member being substantially impermeable to an organic fuel or water at an ambient temperature or below, but being permeable at a temperature higher than an activation temperature; (c) heating means in control relation to the fuel permeation-controlling member to activate fuel permeation through the member on demand. The invented fuel cell is compact and lightweight, with significantly reduced fuel crossover and improved fuel utilization efficiency. The fuel cell is particularly useful for powering small vehicles and portable devices such as a notebook computer, a personal digital assistant, a mobile phone, and a digital camera.

23 Claims, 9 Drawing Sheets

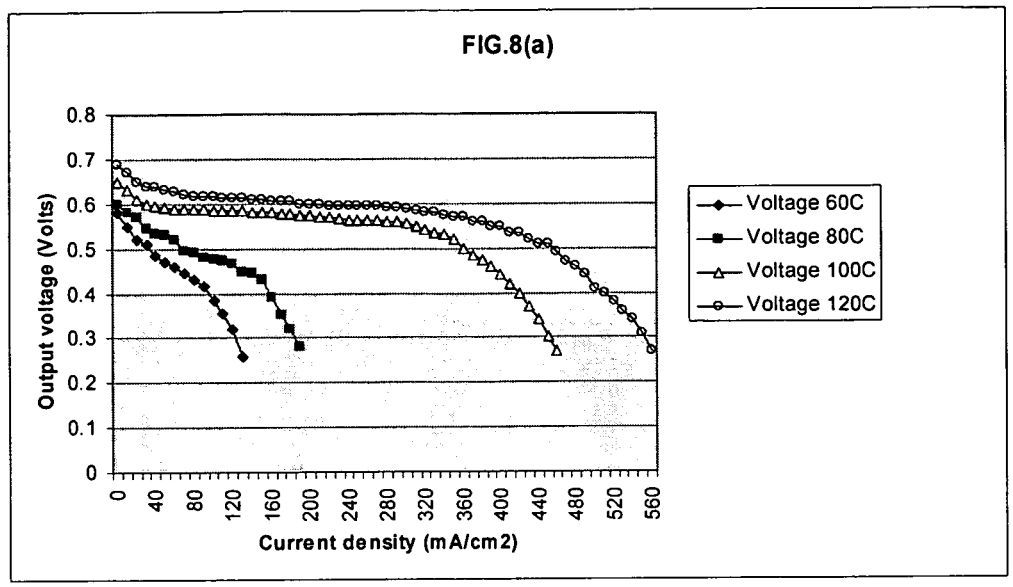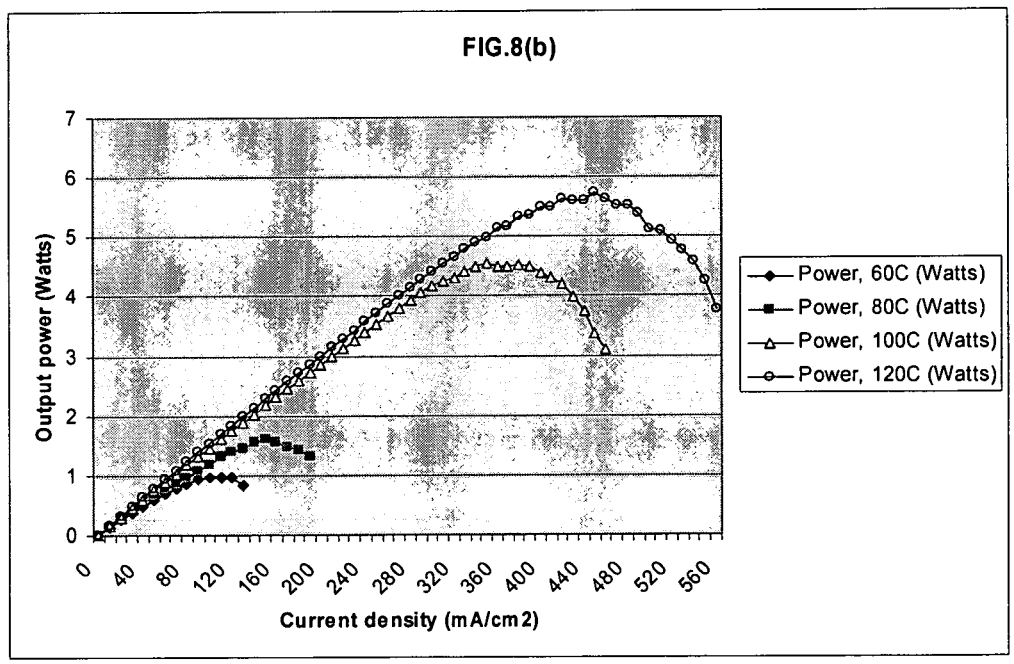

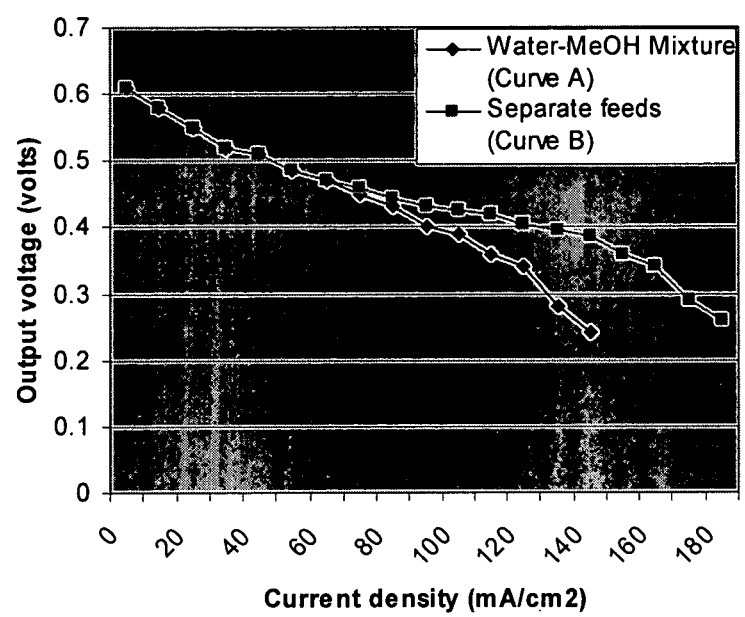

ORGANIC VAPOR FUEL CELL

This invention is a result of a research project supported in part by the NSF SBIR-STTR program.

FIELD OF THE INVENTION

This invention relates to an organic vapor fuel cell (OVFC) operating on a hydrogen-rich organic fuel that is fed into the fuel cell initially in a liquid form, but is turned into a vapor form prior to coming in contact with the electro-catalyst phase in the anode. The invention specifically relates to fuel cells such as the direct methanol fuel cell (DMFC) and the direct ethanol vapor fuel cell (DEFC) that are operated at relatively high temperatures (e.g., 80-160° C.).

BACKGROUND OF THE INVENTION

A fuel cell converts the chemical energy into electricity. A fuel cell differs from a battery in that the fuel and oxidant of a fuel cell are supplied from sources that are external to the cell, which can generate power as long as the fuel and oxidant are supplied. A particularly useful fuel cell for powering portable electronic devices and light-duty vehicles is a direct methanol fuel cell (DMFC) in which the fuel is a liquid methanol/water mixture and the oxidant is air or oxygen. Protons are formed by oxidation of methanol and water at the anode (fuel electrode). Protons then pass through a proton-exchange membrane (PEM) from the anode to the cathode (oxidant electrode). Electrons produced at the anode in the oxidation reaction flow in the external circuit to the cathode to do useful work.

The electrochemical reactions occurring in a direct methanol fuel cell which contains an acid electrolyte may be illustrated as follows:

Anode: $CH_3OH+H_2O \rightarrow CO_2+6H^++6e^-$     (1)

Cathode: $3/2O_2+6H^++6e^- \rightarrow 3H_2O$     (2)

Overall: $CH_3OH+3/2O_2 \rightarrow CO_2+2H_2O$     (3)

The DMFC and other proton-exchange membrane fuel cells (PEMFCs) typically use a hydrated sheet of a perfluorinated acid-based ionomer membrane as a solid electrolyte. The electrodes each typically containing a catalyst phase (usually a thin catalyst layer) are intimately bonded to each side of the membrane. This membrane is commercially available from DuPont (under the trade name Nafion®), among several other suppliers. Many catalysts to promote methanol oxidation (Reaction 1) have been evaluated. Examples include: (1) noble metals, (2) noble metal alloys, (3) alloys of noble metals with non-noble metals, (4) chemisorbed layers on Pt, (5) platinum with inorganic material, and (6) redox catalysts. Based on literature reports, Pt—Ru appears to be the best methanol-oxidation catalyst in acidic electrolytes.

The methanol/water fed to a DMFC may be in the liquid or vapor phase. If fuel cells using liquid fuel are available in small size, they would be able to power small-sized electronic devices for a long time. However, conventional DMFCs require pumps and blowers to feed liquid fuel to the fuel cell (e.g., S. Surampudi, et al., U.S. Pat. No. 6,248,460, Jun. 19, 2001). The resulting power system is complex in structure and large in size. One way to overcome this problem is to utilize capillary action to feed liquid fuel, without using a liquid delivery pump. However, a fuel cell of this type still has the following disadvantages: (1) poor performance due to low electrode reactivity and (2) low fuel utilization efficiency due to methanol cross-over from the anode through the electrolyte membrane to the cathode. This problem of methanol crossing over without being reacted is relatively more severe in a fuel cell with a pressurizing pump than in one without a pump.

It is believed that methanol vapor cells that operate at higher temperatures are advantageous in that the step of methanol ionization to produce protons (e.g., Reaction (1)) proceeds more rapidly in these cells. Presumably, a higher temperature results in a higher catalytic electrode activity and the faster reaction leads to a reduction in fuel cross-over. However, in the conventional DMFC of a vapor feed type, methanol (as a liquid fuel) is introduced by a pump into a vaporizer which vaporizes methanol with the resulting methanol vapor then being fed to the fuel cell by a blower. Unconsumed methanol vapor discharged from the outlet of the fuel electrode is recycled to the methanol tank through a condenser. This process needs a complex system (including a pump, a vaporizer, a blower, and a condenser) and, hence, is not suitable for powering small-sized electronic devices.

Tomimatsu, et al., in U.S. Pat. No. 6,447,941 (Sep. 10, 2002), disclosed a fuel cell in the form of stacked unit cells each having a power generating section composed of a fuel electrode, an oxidant electrode, and an electrolyte plate held in-between. The unit cells are placed on top of one another. In this fuel cell stack, a liquid fuel is introduced into each unit cell by the capillary action and evaporated in each unit cell in a fuel evaporating layer, so that the fuel electrode is supplied with the evaporated fuel. This is a very interesting fuel cell design since it makes use of two sound approaches: liquid feed by capillary action and vapor state reaction. However, the fuel cell configuration is still too complex since each unit cell contains, among other layers, separate anode, liquid-permeating, and fuel evaporating layers. Furthermore, the fuel (water-methanol mixture) will continue to vaporize even at room temperature when the fuel cell is not in operation, leading to continuous parasitic energy loss.

Our co-workers (Yang and Huang, U.S. Ser. No. 10/762, 626, filed Jan. 23, 2004) disclosed a highly efficient direct vapor fuel cell (DVFC) that eliminated some of the drawbacks of the design by Tamimatsu, et al. The DVFC comprises (A) an anode receiving a liquid fuel from a liquid fuel source substantially through diffusion; (B) an electrolyte plate having a first surface adjacent to the anode; and (C) a cathode adjacent to a second surface of the electrolyte plate and opposite to the anode. The anode is provided with a heating environment to at least partially vaporize the liquid fuel inside the anode and the anode further comprises a catalyst phase to ionize the fuel in a vapor form to produce protons and electrons. In both DVFC and Tamimatsu fuel cell, the fuel cell stack is in need of multiple bipolar plates, which are normally extremely thick and brittle, making the whole fuel cell system bulky.

Cropley, et al. (U.S. Pat. No. 6,811,905, Nov. 2, 2004) disclosed an interesting fuel cell structure, which features a vapor diffusion chamber being positioned in front of the anode and a vapor transport member being positioned in front of the vapor diffusion chamber. The vapor transport member is substantially impermeable to an organic fuel/water mixture in a liquid phase but is permeable to the mixture in a vapor phase. According to the disclosure, when the fuel cell is in operation, a liquid fuel mixture delivered to the vapor transport member evaporates from the vapor transport member and is delivered to the anode in vapor form. Cropley, et al. further suggested that the vapor transport member may be selected from pervaporation, permselective, and ionomeric membranes, preferably Nafion® membranes (see Lines 24-50, Column 10 of U.S. Pat. No. 6,811,905). However, there are many drawbacks or shortcomings associated with Cropley's invention, including:

(1) Within the operating temperatures (25°-60° C.) cited by Cropley, et al. (FIG. 6 and FIG. 7 of U.S. Pat. No. 6,811,905), the vapor transport membranes as suggested (e.g., Nafion®) do not allow for significant diffusion rates of the methanol-water mixture, implying that the power-generating rate of these fuel cell systems would be extremely low. Further, very little vapor would be generated at the fuel source side, since the boiling temperatures of methanol and water are 65° C. and 100° C., respectively. The pressure differential between the source side and the sink side (the vapor diffusion chamber) would be very small, providing at best a very small driving force for pervaporation;

(2) The Nafion® membrane (whether being used as a vapor transport membrane or proton exchange membrane) can not be used at a temperature higher than 80° C. for an extended period of time due to its well-known thermal instability or high propensity to get degraded irreversibly;

(3) Clearly, Cropley, et al. did not recognize the significance of operating a DMFC at a temperature higher than 100° C. DMFCs working at a higher temperature (e.g., 120°-150°) on fuel vapors have the following advantages: (a) the step of methanol ionization to produce protons (e.g., Reaction (1)) proceeds more rapidly in these cells (e.g., J. Kallo, et al. "Conductance and Methanol Crossover Investigation of Nafion membranes in a Vapor-Fed DMFC," J. of the Electrochemical Soc., 150 (6) (2003) PP. A765-A769); (b) a higher temperature results in a higher catalytic electrode activity and the faster reaction leads to a reduction in fuel crossover; and (c) higher operation temperatures could drastically reduce or eliminate CO poisoning of platinum or possibly even allow platinum to be replaced by much less expensive catalysts; and (4) Cropley, et al. did not recognize the issues of differential permeation rates between methanol and water through the vapor transport membrane. The water-to-methanol ratio of the fuel after permeation can be drastically different than that of the fuel before permeation. If the methanol-water mixture is delivered to the anode catalyst site at a ratio significantly different from a desirable ratio (e.g., the stoichiometric ratio as defined by the anode electro-chemical reaction), either excess water or excess methanol will be present at the anode side to still cause the fuel crossover problem. Besides, the composition (methanol-to-water ratio) of the water-methanol mixture at the fuel source side will vary with time. This would result in the methanol-to-water ratio of the fuel delivered to the anode catalyst varying with time, leading to unstable fuel cell operation and undesirable side effects.

Therefore, one object of the present invention is to provide a simple configuration for a fuel cell that operates primarily on an organic fuel vapor at a fast and well-regulated reaction rate, with significantly reduced fuel crossover.

A specific object of the present invention is to provide a fuel cell that operates on a liquid-fed methanol/water mixture fuel, which is then vaporized at a regulated rate near the anode catalyst prior to being ionized to produce protons.

A further specific object of the present invention is to provide a fuel cell that feeds on a liquid-fed methanol/water mixture but operates at a temperature higher than 100° C., preferably higher than 120° C.

Another specific object of the present invention is to provide a fuel cell that feeds on a liquid-fed methanol/water mixture at a first water-to-methanol ratio, but operates on a vapor mixture at a second water-to-methanol ratio, which is different than the first ratio. Preferably, this second ratio is closer to the balanced stoichiometric molecular ratio as defined in Eq.(1). This molecular ratio is one-to-one in the case of DMFC.

Still another specific object of the present invention is to provide a fuel cell with a stable, constant organic-to-water feed ratio of the vapor mixture that is transported to the anode catalyst phase for oxidation to produce a stable power output.

BRIEF SUMMARY OF THE INVENTION

The present invention provides a light-weight, compact fuel cell that is well-suited to powering portable electronic devices and vehicles, particularly light-duty vehicles such as golf carts, fork lifts, wheel chairs, motor bikes, and scooters. The fuel cell comprises the following major components: (a) a membrane electrode assembly, comprising (i) a proton exchange membrane (PEM) sandwiched between (ii) an anode (typically comprising an anode backing layer and an anode electro-catalyst layer) and (iii) a cathode (typically comprising a cathode backing layer and electro-catalyst); (b) a fuel permeation-controlling member positioned in front of the anode, with the member being substantially impermeable to an organic fuel and/or water at or below an ambient temperature, but being permeable to the organic fuel and/or water at a temperature higher than an activation temperature to deliver a permeated fuel fluid (preferably a vapor mixture) to the anode; (c) heating means in heat-supplying relation to the fuel permeation-controlling member to activate the permeation of fuel through the member on demand; and (d) fuel supplier to accommodate and feed the organic fuel and water, separately or as a mixture, to the permeation-controlling member.

In a preferred embodiment, a special feature of the presently invented fuel cell is that the fuel (e.g., methanol/water mixture) is supplied initially in a liquid form into the anode primarily via diffusion, preferably under the action of a capillary force. To accomplish this function, the fuel flow channels of the fuel supplier comprise therein a porous fuel-permeating material being in fluid communication with a liquid fuel source and receiving the liquid fuel therefrom. However, the fuel may become partially vaporized before permeation occurs, or permeates through a membrane to become vaporized (e.g., through a pervaporation membrane). The heated environment serves to activate the permeation of fuel through the permeation-controlling membrane and allows the fuel vapor to react at a higher temperature in a more efficient manner for proton generation. When not in operation, the fuel will be substantially retained in the fuel chamber, not leading to parasitic fuel loss. The heating environment may receive the heat generated by the electrochemical reactions occurring at the electrodes. Alternatively or additionally, the heating environment may receive the heat from joule heating by passing a current through a heating element positioned near or at the fuel permeation-controlling membrane.

Another preferred embodiment of the present invention is a planar fuel cell, comprising: (a) a membrane electrode assembly, comprising one solid electrolyte sheet having a plurality of anodes disposed on only one major side of the solid electrolyte sheet and a plurality of corresponding cathodes disposed on only an opposing major side of the solid electrolyte sheet; (b) a fuel permeation-controlling member positioned in front of the anode, with this member being substantially impermeable to an organic fuel and/or water at or below an ambient temperature, but being permeable to the organic fuel and/or water at a temperature higher than an activation temperature to deliver a permeated fuel fluid to the anodes; (c) heating means in heat-supplying relation to the fuel permeation-controlling member to activate fuel permeation through the member on demand; (d) fuel supply means to deliver the organic fuel and water to the permeation-controlling member; and (e) a plurality of current collectors each having an interconnect means, wherein each of the plurality of anodes and each of the plurality of cathodes has one of the plurality of current collectors associated therewith and the interconnect means are arranged to provide electron transfer between anodes and cathodes.

This planar fuel cell system overcomes several shortcomings of prior art fuel cell stacks. For instance, the need to stack several unit fuel cells together normally requires complex flat stack arrangements and involves numerous parts (membranes, gaskets, channels, electrodes and bipolar plates) that are difficult and expensive to fabricate and assemble. Traditional planar fuel cell stacks based on direct methanol fuel cell units also suffer from low fuel utilization and high fuel crossover problems, which are overcome by the present invention.

BRIEF DESCRIPTION OF THE DRAWINGS

FIG. 8 Current-voltage responses of selected fuel cells tested as a function of temperature.

FIG. 9 Current-voltage responses of two fuel cells tested at 65° C., one being fed with a methanol-water mixture (curve A) and the other fed with methanol and water on a separate basis (curve B).

DETAILED DESCRIPTION OF THE INVENTION

Figure 1:
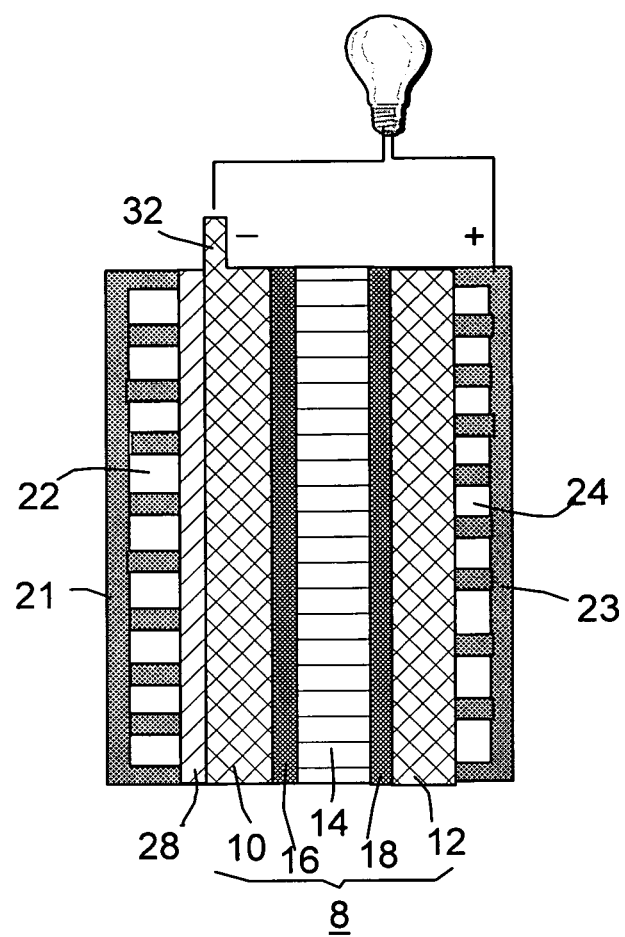
FIG. 1 A cross sectional view showing the structure of the components of a fuel cell that operates on a fuel vapor.

FIG. 1 shows a schematic side view of a first embodiment of a direct organic vapor fuel cell constructed according to the teachings of the present invention. This fuel cell is particularly well-suited for use with methanol as its organic fuel, but is not limited to methanol. Other suitable organic fuels include, for instance, ethanol, propanol, isopropanol, trimethoxymethane, dimethoxymethane, dimethyl ether, trioxane, formaldehyde, formic acid or the like. Nevertheless, for ease of discussion, methanol is illustratively referred to herein as the organic fuel.

The fuel cell shown in FIG. 1 comprises a membrane electrode assembly 8, which comprises a proton exchange membrane 14 (PEM), an anode 10 bonded to one face of proton exchange membrane, and a cathode 12 bonded to the opposite face of PEM, 14. A commonly used PEM in fuel cells is perfluorinated sulfonic acids such as Nafion® from du Pont, which is normally used up to approximately 60° C. However, in the present invention, higher temperature polymers are preferred, including sulfonated poly (ether ether ketone), sulfonated poly (ether sulfone), sulfonated perfluoroalkoxy, polybenzimidazole, sulfonated polyimide, sulphonated polyamide-imide, sulfonated poly phenylene oxide, and copolymers and mixtures thereof. Anode 10 preferably includes a backing layer (e.g., carbon paper) and a platinum/ruthenium electro-catalytic film 16 positioned at the interface between the anode backing layer and PEM 14 for promoting oxidation of the methanol fuel. Similarly, cathode 12 preferably includes a backing layer (e.g., carbon paper) and a platinum electro-catalytic film 18 positioned at the interface between the cathode backing layer and PEM 14 for promoting reduction of the oxidant.

Many other types of oxidation and reduction electro-catalysts may be used. For example, instead of a platinum/ruthenium oxidation electro-catalyst, one may use as the oxidation electro-catalyst (i) the combination of platinum and any other one or more metals from Groups IIIA, IVA, VA, IB, IIB, IIIB, IVB, VB, VIB, VIIB, and VIIIB of the periodic table; (ii) metal oxides of the above-mentioned combination including reduced metal oxides of the combination; or (iii) mixtures and/or alloys thereof. Instead of a platinum reduction electro-catalyst, one may use as the reduction electro-catalyst metal oxides of platinum, including reduced metal oxides of platinum, or mixtures and/or alloys thereof. The oxidation or reduction electro-catalyst may be applied directly to the backing layer of its respective electrode or may be dispersed on a suitable catalyst support, such as a carbon, graphite or other electrically conductive support (e.g., nano-scaled carbon particles), which is in turn applied directly to the backing layer of its respective electrode. Other reduction electro-catalysts known to those skilled in the art, such as sodium platinate, tungsten bronzes, lead ruthenium oxides, lead iridium oxides, lanthanum oxide and macrocyclic or porphyrin structures containing one or more metals, could also be used.

In practice, the proton exchange membrane in a PEM-based fuel cell is typically coated on both sides with a catalyst (e.g., Pt/Ru or Pt) to form a catalyst-coated membrane (CCM). The CCM layer is then sandwiched between an anode backing layer (carbon paper or cloth) and a cathode backing layer (carbon paper or cloth). The resulting five-layer assembly is called a membrane electrode assembly (MEA). Although some fuel cell workers sometimes refer to CCM as a MEA, we prefer to take the MEA to mean a five-layer configuration: anode (or anode backing layer), anode catalyst layer, PEM, cathode catalyst layer, and cathode (or cathode backing layer). Electrodes (anode and cathode) of the MEA have several functions: 1) diffuse oxygen and fuel evenly across the surface, 2) allow water molecules to escape (principally a cathode-side issue), 3) hold back a small amount water to keep the membrane wet and efficient (cathode side issue only), 4) catalyze the reactions, 5) conduct electrons so they can be collected and routed through an electrical circuit, and 6) conduct protons a very short distance to the proton exchange membrane. Both the water management and the electron conduction functions are satisfied with dual role diffusion layers (carbon paper or cloth) which are sandwiched over the catalyst layers. In practice, the diffusion layer can be integral to the current collectors, or a separate piece sandwiched between the current collector and the catalyst layer. In our preferred embodiment, the diffusion layer can be incorporated as part of the current collector or a separate piece.

The fuel cell also comprises a pair of fluid distribution plates 21 and 23, which are positioned on opposite sides of membrane electrode assembly 8. Plate 21, which serves as a fuel distribution plate, is shaped to define a fuel chamber 22 facing towards anode 10. Chamber 22 is designed to hold a quantity of a liquid mixture of methanol and water. An input port and an output port (not shown), being in fluid communication with chamber 22, may also be provided in plate 21 so that carbon dioxide can be withdrawn from chamber 22 and the fuel can be replenished.

Plate 23 is shaped to include fluid channels 24 for passage of a quantity of gaseous oxygen (or air). An input port and an output port (not shown) are provided in plate 23, which are in fluid communication with channels 24 so that oxygen (or air) can be transported to the cathode 12 through the input port and water and excess oxygen (or air) can be withdrawn from channels 24 through the output port. Plate 23 is electrically conductive and in electrical contact with cathode 12. It can be used as a uni-polar plate (the positive terminal of the electrical current generated by the fuel cell unit) or a bi-polar plate.

In addition, the fuel cell comprises a fuel permeation-controlling member 28 being positioned in front of the anode 10 (between anode 10 and the fuel distribution plate 21) and in physical contact with fuel inside the fuel chamber 22. The fuel permeation-controlling member 28 is substantially impermeable to an organic fuel and/or water at an ambient temperature or below, but permeable to the organic fuel and/or water at a temperature higher than an activation temperature ($T_a$).

Figure 2:
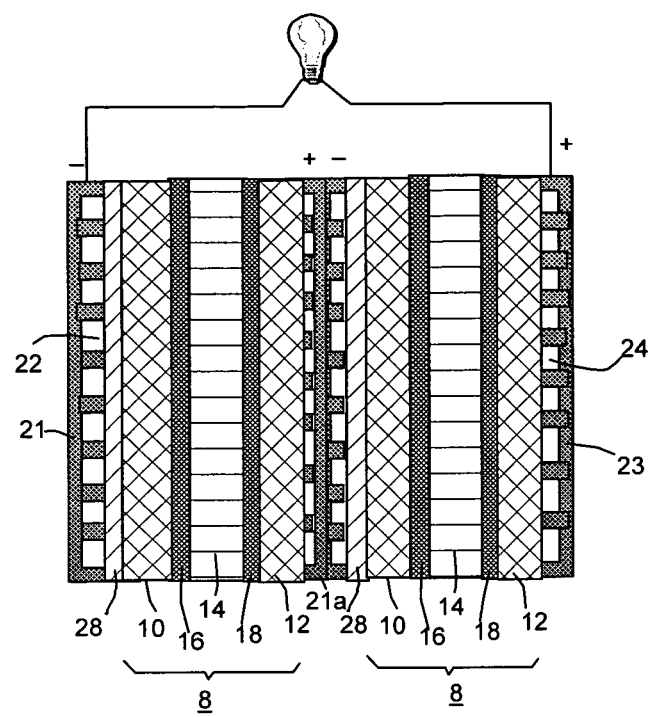
FIG. 2 Schematic of a fuel cell stack comprising two organic vapor fuel cell units.

The fuel permeation-controlling member 28 may be made to be electrically conductive, which is electrically connected to plate 21, which is also electrically conductive (e.g., made of metal, graphite, or carbon fiber composite). Alternatively, fingers of plate 21 may be allowed to penetrate through member 28 to come in physical contact with the anode (e.g., made of carbon paper). In either case, plate can serve as a current collector. When a stack of multiple fuel cell units are desired, as is usually the case in real practice, plate 21 may be integrated with plate 23 to form one bi-polar plate (21a in FIG. 2), which contains both fuel fluid channels or chambers (similar to 22) and oxidant distribution channels (similar to 24) all in one integrated plate. Although FIG. 2 shows only two fuel cell units as an example, multiple bipolar plates may be interposed between individual fuel cell units to form a fuel cell stack, which, along with a frame, end plates, and electrical connections could constitute a fuel cell system.

Figure 3:
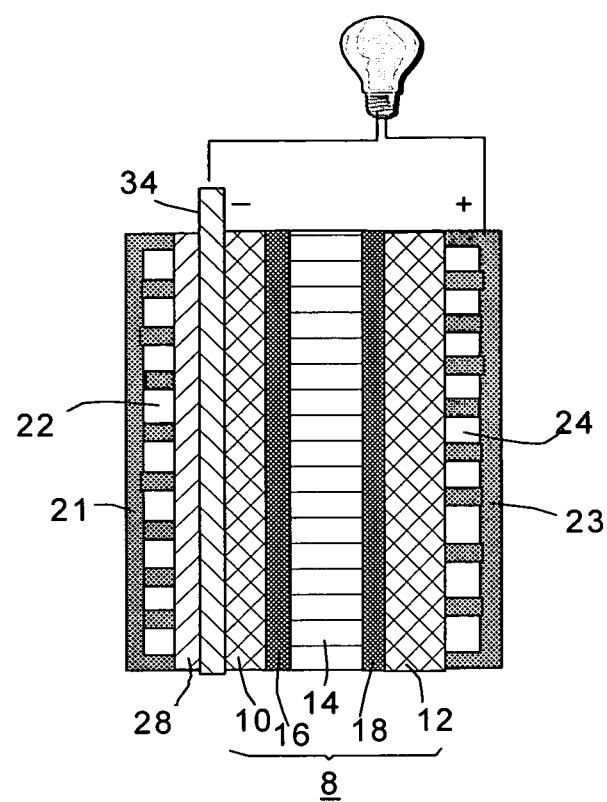
FIG. 3 A cross sectional view showing the structure of the essential components of a fuel cell wherein an electrically conductive layer is inserted between the anode and the fuel permeation-controlling member.

Alternatively, if the fuel-permeation-controlling member 28 is not electrically conductive, then a part of the anode structure (e.g., a tab 32 in FIG. 1) may be protruded out of the fuel cell unit periphery to act as a negative terminal for the electrical current generated by the fuel cell. Optionally, an additional conductive layer (e.g., 34 in FIG. 3), such as a metallic screen, a porous metal sheet, a sheet of carbon foam, paper or felt, and a perforated carbon plate, may be used to support the fuel permeation-controlling layer, and protruded out to serve as a negative terminal. In this case, fuel plate 21 does not have to be electrically conductive.

One feature or function of the fuel permeation-controlling member 28 is to separate or isolate the fuel in the fuel chamber 22 from the anode 10 when the fuel cell is not in operation, normally at an ambient temperature (e.g., room temperature) or below. A second feature of member 28 is to allow the fuel solution, in liquid or vapor form, to permeate through membrane 28 when it is heated to a temperature above an activation temperature $T_a$. The permeated fuel migrates through the anode layer 10 (typically a porous carbon paper sheet) and reaches the anode electro-catalyst layer 16 in a vapor form. The fuel that permeates through the fuel permeation-controlling member 28 may be in the form of a liquid, liquid-vapor mixture, or preferably vapor. However, the permeated species that reaches the anode preferably contains some vapor and most preferably contains vapor only, no liquid.

The fuel permeation-controlling member 28 may be made of any material that is substantially non-permeable to liquid organic fuel and water at or below a selected temperature (ambient temperature), but that does allow a significant amount of liquid and/or vapor fuel to permeate through its structure at a temperature higher than another selected temperature (the activation temperature, $T_a$). Accordingly, fuel permeation-controlling member 28 may be made of any of a large number of polymeric materials, ceramic materials, ceramic-supported polymers (hybrid materials), and composite materials.

One class of material that can be used to construct a fuel-permeation-controlling member 28 is the pervaporation material. The pervaporation material has been used primarily for separation of organic species through the mechanism of differential permeation. In one application of a pervaporation membrane, for instance, water from a contaminated organic stream is preferentially transported across a thin membrane film. The source side of the membrane is wetted with the water-containing organic liquid. A vacuum or a sweep gas is used on the sink side of the membrane to facilitate or promote water permeation through the membrane. The permeated water is collected from the sink side by condensation. In principle, a pervaporation membrane can be used to deliver a fuel vapor to the anode electro-catalyst. As indicated earlier, Cropley, et al. (U.S. Pat. No. 6,811,905, Nov. 2, 2004) used a pervaporation-based vapor transport member to deliver a methanol-water fuel vapor for a DMFC. During the DMFC operation, a liquid fuel mixture delivered to the pervaporation member evaporates from the member and is delivered to the anode in vapor form. However, the vapor transport membranes as suggested by Cropley, et al. (e.g., Nafion®) do not allow for the methanol-water mixture to permeate through at a sufficiently high rate, leading to an extremely low power-generating rate of the fuel cell (at up to 60° C., the maximum operating temperature of Cropley's fuel cells). Cropley, et al. failed to suggest utilization of a vacuum, a sweep gas, or a pressure difference to accelerate or promote fuel permeation through the pervaporation membrane. If the reaction temperature is favorable to a complete conversion of fuel to electrons and protons, no methanol would be left for "fuel crossover". This is why a fuel cell operating temperature in the range of 100° C.-150° C. has been suggested to be optimal. We have conducted a relatively thorough study to address the above issues.

It is important to emphasize again that pervaporation is a separation process whereby a liquid mixture is separated based on the preferred solubility and diffusivity of the components of the mixture through an active membrane phase. On the permeate side of the membrane the partial vapor pressure of the species to be removed is maintained at a level much lower than its value under ambient conditions by maintaining vacuum or using a sweep gas (for example, air or nitrogen). The permeating species undergo a phase change (from liquid to vapor) as they diffuse through the membrane. Applications of pervaporation technology include (1) dehydration of alcohol-water streams (water permeates through, but alcohol stays in the source side), (2) removal of organic pollutants from dilute aqueous wastes (organic species permeates through, but water stays in the source side), and (3) separation of close boiling point mixtures and isotropic mixtures. This implies that a pervaporation membrane can be used to advantageously adjust the methanol-water ratio from one value at the fuel source to a different (desirable) value at the anode side. Cropley, et al. did not recognize or address the issues of differential permeation rates between methanol and water. The water-to-methanol ratio of the fuel after permeation can be drastically different than that of the fuel before permeation. Clearly, it would be highly advantageous to deliver the methanol-water mixture to the anode catalyst site at a ratio that is close to the desired stoichiometric ratio as defined by the anode electro-chemical reaction. This will be further discussed at a later section.

Another class of material for the fuel-permeation-controlling member is the vapor permeable material. Vapor permeation is similar to pervaporation with one major difference— vapors, instead of liquid, contact the source side of the membrane. In contrast to other membrane filtration processes, pervaporation/vapor permeation works according to a solution diffusion mechanism. The membrane itself is normally substantially non-porous, but the diffusion rate can still be highly temperature dependent since the diffusion coefficient of a molecule in a host material is temperature dependent. We have surprisingly found that polymers with an amorphous phase (such as in a semi-crystalline polymer) can exhibit a substantial vapor permeation rate at a temperature near or above the glass transition point (Tg) and a minimal permeation rate below Tg. Diffusion of organic species and/or water molecules take place presumably through the amorphous phase, which is rigid and substantially impermeable at a temperature lower than Tg. When above Tg, the molecular chains in the amorphous phase become mobile with large-scale molecular segmental rotation or translation being possible, thereby facilitation diffusion of low molecular weight molecules.

Yet another class of fuel permeation-controlling member material is micro-filtration or ultra-filtration material, e.g., ionomeric membranes used in reverse osmosis and ultra-filtration such as cellulosic, polyamide, or polybenzimidazole membranes. In micro-filtration or ultra-filtration, porosity is the key to preferential transport, and the flux rate depends upon molecular size. This implies that methanol and water molecules, being different in sizes, will permeate through the filtration membrane at different rates. By contrast, in pervaporation/vapor permeation, molecular interaction between membrane and separated species is the determining factor rather than the molecular size. If methanol is more affinitive (than water) to the pervaporation/vapor permeation membrane, methanol will wet the membrane better and enter the membrane at a faster rate. It is the chemical compatibility of the membrane material with the chemical species of interest that determines the permeation selectivity and hence the separation properties of the permeation process.

To allow for pervaporation and/or vapor permeation of the methanol-water mixture, ultra thin, hydrophilic films of appropriate polymer may be deposited onto a highly porous support matrix. Such a combination will provide high throughput along with good mechanical stability. Since both water and methanol need to be transported across the membrane at a temperature higher than $T_g$, a high trans-membrane flow hydrophilic membrane must be used. The trans-membrane flow is a function of the composition of the feed. It is usually expressed as permeate amount per membrane area and unit time, e.g. kg/m$^2$-hr. A further essential criterion for the suitability of the pervaporation membrane is its chemical and thermal stability. To obtain a high trans-membrane flow and a sufficient driving force, it is necessary to operate the pervaporation process at the highest possible temperatures. This means that the membrane will be in contact with a feed mixture at high temperature which has a high concentration of organic components.

To achieve an economical lifetime of the membranes all components of the membrane must be durable under aggressive conditions. The most common dehydration membrane reported in literature for use in pervaporation processes is prepared from polyvinyl alcohol (PVA). Miyosawa, in U.S. Pat. No. 4,016,129, described a hardenable coating comprising an aqueous dispersion of silica-PVA complex prepared by the reaction between colloidal silica dispersion and PVA solution. U.S. Pat. No. 4,279,752 describes uniform, porous PVA membranes. This process includes extracting the silica particles from the partially developed membrane. For high temperature applications (100° C.-150° C., or higher), sulfonated versions of thermally stable polymers are particularly useful. Examples are sulfonated poly (ether ether ketone) (PEEK), sulfonated poly ethersulfone (PES), sulfonated perfluoroalkoxy, polybenzimidazole, sulfonated polyimide (PI), sulfonated polyamide-imide (PAI), sulfonated poly phenylene oxide (PPO), and copolymers and mixtures thereof. In addition, composite membranes with matrix polymers such as sulfonated poly vinylidene fluoride and sulfonated fluorinated ethylene propylene may also be used in the presently invented permeation-controlling member. Non-polymeric materials commonly used as diaphragms or separators, such as certain ceramic materials and ceramics blended with polymers, are also suitable for use as permeation-controlling membrane.

Another particularly useful class of permeation-controlling member material is a hybrid structure that consists of a micro-porous support being impregnated and fully penetrated from the support's interior surface to its exterior surface, by a permselective, essentially non-porous solid organophilic polymer. A preferred organophilic polymer is an elastomer, preferably a silicone polymer. The micro-porous support, by itself, does not need to have a membranous function. The function of the micro-porous support is to reinforce the polymer, which essentially completely impregnates the support. This organophilic polymer may be more permeable to the organic fuel component (e.g., methanol) than water. In this case, a methanol-water mixture with a higher-than-stoichiometric molecular ratio (higher than one-to-one) may be fed to the fuel chamber 22, but the permeated fuel mixture may become stoichiometric for the anode electro-chemical reaction.

Another useful permeation-controlling material is a composite or hybrid structure that comprises a porous membrane and an active layer formed on the porous membrane. The porous membrane includes as a major constituent a polymer having a repeating unit represented by the formula -(-Ph-S-Ph-SO$_2$-)$_n$-, wherein Ph represents phenyl group and n represents a natural number. The active layer is made of a material having a pervaporation capability as described above, such as PEEK, polydimethylsiloxane, polytrimethylsilylpropine-1, and polyvinyl alcohol. This class of membrane exhibits excellent organic solvent resistance, heat resistance, and organic vapor resistance.

Permeation-controlling member 28 may take any of a number of different configurations. Examples of suitable configurations include, but are not limited to, plate and frame; spiral wound; tubular; hollow fiber; and other designs typically used in electrochemical cells and transport processes. Thin films are most preferred.

In operation, the methanol-water mixture fuel is delivered to channels or chambers 22 of plate 21 with the fuel coming in contact with permeation-controlling member 28. With permeation-controlling member 28 being set at a temperature higher than the activation temperature $T_a$, the fuel permeates through member 28 and, thereafter, passes through porous anode layer (e.g., carbon paper). Depending on the nature of the permeation-controlling member and the temperature of the fuel at membrane 28, the permeated species may be in liquid, vapor, or mixed liquid-vapor form. With the member 28 containing or being a pervaporation membrane, all the permeated species are in vaporous form. For all other types of membranes, the permeated species will be in vaporous state provided the surrounding near the anode is at a temperature higher than boiling points of both components (e.g., 64° C. for methanol and 100° C. for water). Preferably, the fuel cell is operated in such a way that the fuel that reaches the anode catalyst side is in a vaporous form at a relatively high temperature (>100° C., preferably >120° C.). At the anode catalyst side, oxidation of the fuel vapor occurs to form carbon dioxide (or other species), protons and electrons. Carbon dioxide then diffuses back from the anode through permeation-controlling member to plate 21 and exit through the exit port (not shown). The electrons generated at anode 10 flow through an external circuit to cathode 12, producing an electrical current. The protons generated at anode 10 migrate across the proton exchange membrane 14 to cathode 12 where they react with the electrons conducted by plate 23 and oxygen (or air) that has diffused to cathode 12 after having been admitted into channels 24 of plate 23 through an inlet port (not shown). Water present at the cathode 12 and any excess oxygen (or air) are then conducted back to channels 24 of plate 23 and are discharged through an exit port (not shown). If cooling of a part of the fuel cell is needed, it can be accomplished by the circulation of the liquid fuel mixture through plate 21 continuously or intermittently.

It may be noted that, the permeation-controlling layer 28 may be isolated or separated from the reaction electrodes in such a distance that the fuel inside the fuel passages 22 remains substantially in a liquid or mixed liquid-vapor state. The vapor provides a pressure to increase the driving force for permeation of fuel through the membrane 28. It is desirable to select the electrolyte layer thickness and other reaction conditions such that the catalyst phase is heated by the reaction heat to a temperature not lower than about 60° C. (boiling point of methanol) and, most preferably, no lower than 100° C. in the case of using methanol/water mixture as the liquid fuel.

Alternatively, one may choose to introduce a thin metal wire or conductive fiber (not shown) into the anode side (e.g., near or in the permeation membrane, or the anode backing layer) to help vaporize the liquid fuel in the vicinity of the catalyst phase. A small amount of current may be allowed to flow through this wire or fiber to produce joule heat. A minute temperature sensor element (e.g., a thin thermocouple wire) may be placed inside the anode to monitor the catalyst phase temperature. Temperature monitoring and control devices or circuits are well-known in the art. Such a combined heating element-sensor arrangement is advantageous in that additional heat may be supplied to vaporize more fuel on demand (e.g., when needed, more current may be supplied to the external load by providing more vaporous fuel at a faster rate and allowing the reactions to proceed at a higher temperature). With such added adaptability, the fuel cell essentially becomes a smart, actively controlled power source. A simple logic circuit may be added as a part of the fuel cell voltage regulator or control circuit that is normally installed in a fuel cell for electronic device applications.

The heating means may comprise using a rechargeable battery to provide initial heating to begin a fuel cell operation. The battery can be recharged once the fuel cell begins its operation. The heating means may comprise feeding a fraction of the current generated by the fuel cell to the heating element. The resulting improvement in power output from the fuel cell much more than compensates for the small fraction of current rerouted to the heating element.

Figure 4:
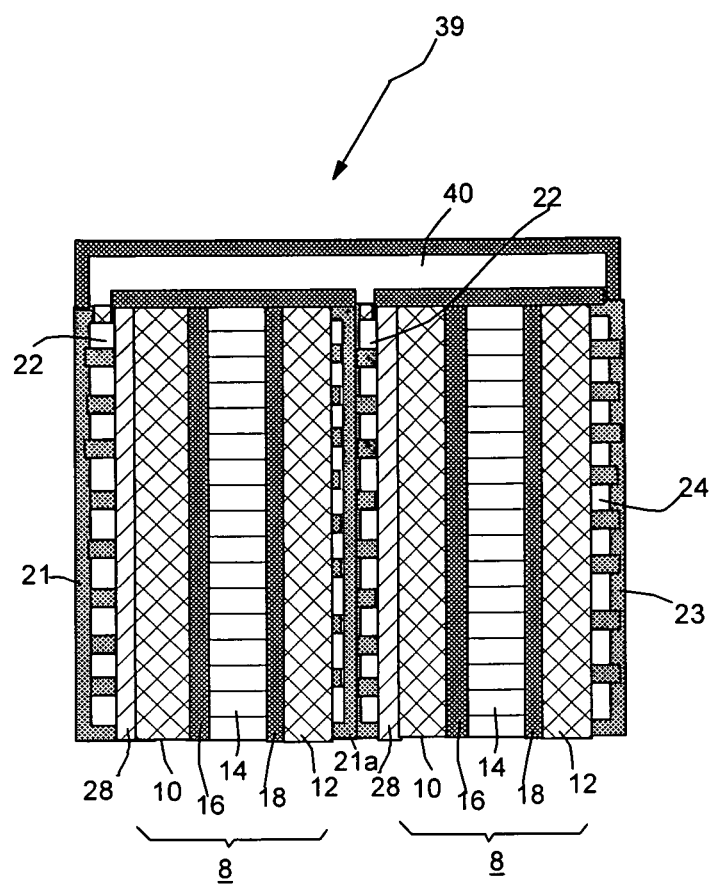
FIG. 4 Schematic of a fuel cell stack with a fuel source chamber 40 feeding organic fuel-water mixture through fuel flow channels 22 to the fuel permeation-controlling member 28.

As a means to feed liquid fuel to the fuel channels 22 of fuel plate 21 (and 21a) from a fuel source, there is formed a liquid fuel passage 40 along at least one side of the stack 39 (FIG. 4). It is advantageous to incorporate a fuel permeating material into the fuel cavity 22 to facilitate liquid fuel feeding by a capillarity force. In other words, upon introduction into the liquid fuel passage 40, the liquid fuel is fed to the fuel passage channels 22 in front of the permeation-controlling member 28 by the capillary action from the side of the stack 39. In order to supply liquid fuel to the fuel cavity by the capillary action, the fuel cell is constructed such that the liquid fuel which has been introduced into the liquid fuel passage 40 comes in direct contact with the end surface of member 28. One way to supply liquid fuel from the fuel source to the liquid fuel passage 40 is to permit the liquid fuel to drop spontaneously by gravity and to enter the liquid fuel passage 40. This gravitational method offers the advantage of assuring the introduction of the liquid fuel into the liquid fuel passage 40, although it requires that the fuel source be positioned above the top of the stack 39. Another method is to introduce the liquid fuel from the liquid fuel source by the capillary action of a fuel permeating material disposed in the liquid fuel passage 40. This method does not require that the joint between the liquid fuel source and the liquid fuel passage 40 (or the fuel entrance of the liquid fuel passage 40) be arranged above the top of the stack 39. When combined with the gravitational method, this method offers the advantage of being free to install the fuel source at any place or orientation. The liquid fuel passage 40 may be formed on one side or both sides of the stack 39.

The fuel source described above may be made detachable from the fuel cell proper, so that the fuel cell can be run for a prolonged period of time by intermittently replenishing the fuel source. The feeding of the liquid fuel from the fuel source to the liquid fuel passage 40 may be accomplished by gravity or by pressure in the source. An alternative feeding method is to extract the liquid fuel by the capillary action of the liquid fuel passage 40.

The structure of the fuel permeating material in the fuel cavity 22 or the fuel passage 40 is not specifically restricted as far as it permits the liquid fuel to permeate through it by the capillary action. It may be made of a porous material, cotton, non-woven fabric, highly porous paper, or woven cloth of fibers. The fuel permeating material draws liquid fuel into it by the capillary action. For the effective use of the capillary action, the fuel-permeating porous material should be formed such that its pores are interconnected and its pores have an adequate pore diameter. The porous material may have any pore diameter which is not specifically restricted, as long as it permits the liquid fuel to be drawn into the liquid fuel cavity 22 or passage 40. However, the pore diameter is preferably 0.01 to 150 µm in view of the capillary action of the liquid fuel passage 40. Furthermore, the pore volume as an index of pore continuity should preferably be 20 to 90% of the porous material. With a pore diameter smaller than 0.01 µm, it becomes difficult for liquid fuel to diffuse through the pores; this could be understood from the well-known Darcy's Law that describes the diffusion behavior of a liquid through a porous medium. With a pore diameter larger than 150 μm the porous material is poor in its capillary action. With a pore volume less than 20%, the porous material has closed pores in a higher proportion and hence is poor in its capillary action. With a pore volume fraction greater than 90%, the porous material has a higher proportion of continuous pores but is poor in strength and present difficulties in fabrication. Practically, the pore diameter should preferably be 0.5 to 100 μm and the pore volume fraction should preferably be 30 to 75%.

The cavity or channel 22 may be liquid fuel feeding grooves formed in the surface of plate 21, in contact with the fuel permeating material. The capillary action of these grooves may be used to draw liquid fuel into the fuel permeating material also through the capillary action. In this case, the liquid fuel passage 40 should be formed such that the open ends of the liquid fuel feeding grooves 22 come into direct contact with the liquid fuel passage 40 (FIG. 4). Alternatively, it is possible to use the capillary action of the liquid fuel feeding grooves 22 in combination with the capillary action of the porous material constituting the fuel permeating material in the grooves 22.

It may be noted that the liquid fuel feeding grooves 22 are not specifically restricted in configuration as long as they are capable of producing an adequate capillary action. However, they should be formed such that their capillary action is smaller than that of the fuel permeating material. Otherwise, the liquid fuel will not be fed from the liquid fuel passage 40 to the fuel permeating material. The liquid fuel feeding grooves 22 are intended to extract liquid fuel from the liquid fuel passage 40 by their capillary action. Therefore, they should be formed such that their capillary action is greater than that of the liquid fuel passage 40 in the case where the liquid fuel is introduced from the fuel source into the liquid fuel passage 40 by its capillary action. Thus, the configuration of the liquid fuel feeding grooves 22 should be formed in accordance with the configurations of the porous material constituting the fuel permeating material in the cavity 22 and the liquid fuel passage 40.

Figure 5:
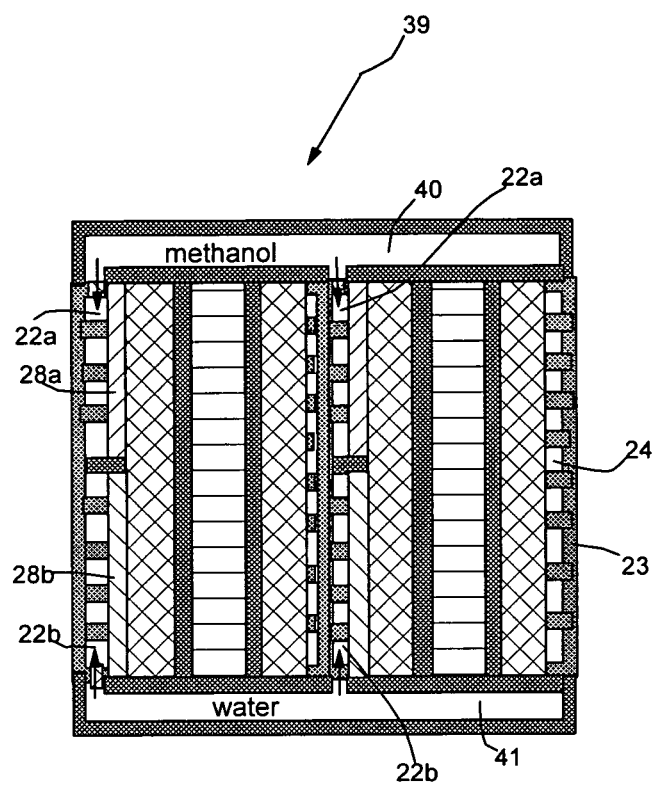
FIG. 5 Schematic of a fuel cell stack with a first fuel source chamber 40 feeding organic fuel (e.g., methanol) through fuel flow channels 22a to a first zone 28a of the fuel permeation-controlling member and a second fuel source chamber 41 feeding water through flow channels 22b to a second zone 28b of the member.

In another embodiment of the present invention, the fuel cell comprises fuel supply means that include multiple separate chambers (e.g., 22a and 22b in FIG. 5) to accommodate the organic fuel and water on a separate basis. At least one chamber accommodates the organic fuel (e.g., 22a) and a second chamber is used to house water only (e.g., 22b). This arrangement allows for separate replenishment of organic fuel and water. The by-product water generated by the cathode reaction can be captured and fed back to the water chamber without upsetting the organic-water ratio in other chambers. Furthermore, the fuel permeation-controlling member may be designed to include multiple fuel permeation materials at different zones of the member. For instance, a first fuel chamber (22a) may be used to accommodate the organic fuel that comes in contact with and wet a surface of a first fuel permeation material 28a at one zone of the member. This chamber receives organic fuel from a fuel source 40a. A second chamber (22b) accommodates water that contacts and wets a surface of a second fuel permeation material 28b at another zone of the member. This second chamber receives water from a water source 40b. The fuel permeation-controlling member can be composed of two or more zones or segments of fuel permeation membranes (e.g., 28a, 28b in FIG. 5). At a given operating temperature, these membrane zones provide desired flow rates of organic fuel and water into the anode side where organic fuel and water vapors mix at a desired ratio when the mixture reaches the anode catalyst site. A membrane can be tailored to give a desired water permeation rate and another membrane tailored to give a desired organic fuel permeation rate. For a membrane material that is permeable to both water and organic fuel (e.g. methanol) at non-proportional rates, the same type of membrane but of different thicknesses or surface treatments may be used to allow for water and methanol to permeate at a ratio that is approximately one-to-one on a molecular basis. In this case, different segments (zones) of the fuel permeation-controlling member could contain the same type of membrane material, but simply different surface functional groups and/or thicknesses.

The above multiple-chamber approach can be applied to the cases where fuel permeation member allows for permeation of an organic fuel and water vapor even at ambient temperature, but not for permeation of organic fuel and water in liquid form. In these cases, the fuel permeation member may have the liquid water and/or organic fuel coming in contact with one major surface of the member, being absorbed by the member and allowed to migrate through the member, and finally leaving from another major surface of the member in a vapor form. This member could comprise any type of the aforementioned membranes (e.g., a pervaporation membrane), provided they exhibit a non-negligible permeation rate at ambient temperature. Hereinafter, this member is referred to as a vapor-generating membrane.

Hence, another embodiment of the present invention is a fuel cell comprising: (a) a membrane electrode assembly (MEA) with the MEA comprising (i) a proton exchange membrane (PEM) having a front face and a rear face, (ii) an anode coupled to the front face, and (iii) a cathode coupled to the rear face of the PEM; (b) a vapor mixing and diffusion member positioned in front of the anode; (c) a vapor-generating member (VGM) positioned in front of the vapor mixing and diffusion chamber with the VGM comprising a plurality of membrane zones being substantially impermeable to an organic fuel and/or water in a liquid phase but being permeable to the organic fuel or water in a vapor phase; (d) fuel supply means comprising a plurality of fuel-feeding chambers corresponding to the plurality of membrane zones and feeding a fuel thereto, wherein the feeding fuel in the first of the chambers differs in composition from the feeding fuel in a second of the chambers; and (e) means for electrically interconnecting the anode and the cathode through an external load.

In one preferred embodiment, the feeding fuel in the first chamber comprises essentially water only and the feeding fuel in the second chamber comprises essentially the organic fuel only. In another embodiment, the feeding fuel in the first chamber comprises an organic fuel-water mixture with X % organic and (1-X %) water, and the feeding fuel in the second chamber comprises an organic fuel-water mixture with Y % organic and (1-Y %) water, where $1 \leq X \leq 100$, $0 \leq Y \leq 100$, and $X \neq Y$. For instance, one chamber may contain a fuel with a high concentration of methanol (small proportion of water) and another chamber may contain pure water or water with a small amount of methanol.

The vapor-generating member (VGM) may comprise a membrane selected from the group consisting of a pervaporation membrane, permselective membrane, ionomeric membrane, polymer gel, and combinations thereof. Some of the pervaporation membranes, permselective membranes, or ionomeric membranes do allow for permeation of water and a specific organic fuel even at room temperature, albeit usually not at a great rate. A polymer gel is an interesting choice for VGM. A polymer gel is a lightly cross-linked polymer network that can be swollen by a "solvent" (e.g., water, methanol, and water-methanol mixture) to a controlled extent. Examples include polyacryamide (PAAm), poly acrylic acid, a graft copolymer of poly (methacrylic acid) (PMAA) and poly (ethylene glycol) (PEG), and several other lightly cross-linked polymers derived from water-soluble polymers. For instance, a synthetic polymer gel may be prepared by reacting a water-soluble polymer of an aliphatic carboxylic acid or a salt thereof with a sparingly soluble aluminum compound, an organic acid containing a hydroxyl group in its molecule as a reaction accelerator, and an ethylenediamine compound as a reaction inhibitor in the presence of water at a pH of 4.0 to 6.1. The polymer gel, when used as a membrane layer, can absorb a controlled quantity of liquid fuel (e.g., methanol and water separately or as a mixture) from a fuel source and releases the fuel in a vapor form at the anode side, provided the temperature and vapor pressure of the anode side are favorable to vaporization. Methanol and ethanol are highly volatile and, hence, can be readily released from the anode side even at room temperature.

The vapor-generating member may be a sulfonated polymer, a porous ceramic membrane, a ceramic-supported polymer membrane, a composite membrane, or a combination thereof. A ceramic-supported polymer gel is also a good choice. The vapor-generating member is preferably electrically-conductive. The fuel cell may further comprise an electrically-conductive, vapor mixing and diffusion member positioned between the vapor-generating member and the anode. The electrically-conductive vapor-generating member is made to be in contact with the electrically-conductive vapor mixing and diffusion member, which is in turn in contact with the anode. Such an arrangement provides a continuous path for electron transfer to a negative terminal, possibly through a bipolar plate-type current collector. The vapor mixing and diffusion member may comprise a member selected from the group consisting of a metallic screen, porous metal sheet, carbon foam, carbon paper, carbon felt, carbon cloth, perforated metal, perforated carbon or graphite plate, perforated carbon or graphite composite, and combinations thereof. This vapor mixing and diffusion chamber may be used as a current collector. Again, the anode preferably comprises an anode electro-catalyst film positioned at its interface with the proton exchange membrane and the cathode comprises a cathode electro-catalyst film positioned at its interface with the proton exchange membrane. A plurality of fuel cells may be connected in series, in parallel, or in both series and parallel, wherein at least one of the plurality of fuel cells is a fuel cell herein defined.

It is clear that a system comprising the invented fuel cell overcomes many of the shortcomings associated with conventional liquid feed and conventional vapor feed fuel cell systems in the following ways:

(1) As compared to conventional liquid feed systems, a system comprising the invented fuel cell does not involve having a liquid fuel mixture come into direct contact with the anode and thereby avoids the high rates of cross-over and flooding typically experienced in conventional liquid feed systems. This feature results in an increase in fuel efficiency.

(2) Because the fuel mixture can be delivered to the permeation-controlling member at a much higher methanol-to-water ratio, which is then converted to an ideal 1:1 ratio, a system comprising the invented fuel cell is able to accommodate fuel mixtures having a greater methanol concentration than is the case in a conventional liquid feed system. This increase in methanol concentration leads to an increase in fuel cell performance and to a lower system volume and weight. In the case of multiple fuel chambers, one chamber can supply pure methanol and another chamber can supply pure water only to their respective zones of the fuel permeation-controlling member (with different zones featuring different membrane materials or thicknesses). This configuration obviates the need for a large container to house a highly diluted methanol solution with a sufficient quantity to sustain a reasonable period of fuel cell operation. Further, feeding of methanol and water to the fuel permeation-controlling member on a separate basis ensures a constant vapor mix ratio.

(3) As compared to vapor feed systems, a system comprising the presently invented fuel cell does not require the use of external equipment for heating the fuel mixture to a vapor state, the use of external equipment for heating and pressurizing the fuel cell, or the use of special cooling equipment.

(4) The present fuel cell design allows the fuel cell operating conditions and the fuel permeation-controlling member to be tailored in such a manner that it provides organic fuel and water as needed for the electrochemical reaction. In this mode of operation, the fuel vapor will be consumed as it is produced, allowing very little fuel to permeate into and across the proton exchange membrane. Also, since vapor, rather than liquid water, is present at the anode-PEM interface, the net water drag to the cathode will be substantially lower than in a liquid system. These features again result in maximized fuel efficiency and minimized fuel cross-over.

(5) The capillarity force-driven mechanism makes it possible to have a very simple liquid fuel feeding mechanism, making the complete fuel cell system simple, compact, lightweight, and reliable.

To achieve a desired output voltage level, a number of these unit fuel cells can be stacked together to form a fuel cell assembly. A number of individual cells can be electrically connected in series by abutting the anode current collector of one cell with the cathode current collector of its nearest neighbor in the stack. Fuel and oxidant are introduced through manifolds into respective chambers. Hence, another embodiment of the present invention is a fuel cell stack that comprises at least two unit fuel cells as defined in earlier sections. These fuel cell units may be connected in series, in parallel, or a combination of both.

However, stacking and porting unit fuel cells may require complex flat stack arrangements and involve numerous parts (membranes, gaskets, channels, electrodes and bipolar plates) that are difficult and expensive to fabricate and assemble. Traditional fuel cell stacks are highly prone to catastrophic failure of the entire system if a leak develops. The cost of fabricating and assembling fuel cells is significant, due to the materials and labor involved. In addition, it is difficult to transport the oxygen and fuel through the stack, and increased gas or liquid transport requires pressurization, with attendant difficulties.

An alternative style of fuel cell has been recently proposed (e.g., Binder, et al., U.S. Pat. No. 5,783,324, Jul. 21, 1998 and Pratt, et al., U.S. Pat. No. 6,127,058, Oct. 3, 2000), which is a side-by-side configuration in which a number of individual cells are placed next to each other in a planar arrangement. This is an elegant solution to the problem of gas and fuel transport and mechanical hardware. However, a planar fuel cell configuration based on the conventional direct methanol fuel cell (DMFC) approach is still subject to the same problems associated with all DMFCs (e.g., fuel crossover, low fuel utilization efficiency, etc.). An improved planar fuel cell that is more fuel efficient would be a significant addition to the field.

Hence, another preferred embodiment of the present invention is a planar or co-planar fuel cell configuration that features the fuel permeation-controlling member described above. A co-planar fuel cell, also referred to as a strip or segmented fuel cell, comprises several series-connected cells that are fabricated on the same continuous strip or sheet of membrane. Alternatively, separate pieces of membrane electrolyte, together with an anode on one side thereof and a cathode on the opposite side thereof, may be used for each cell.

In a planar fuel cell (e.g., FIG. 6), several anodes 52 are bonded to one side of a sheet of membrane electrolyte and are exposed to an organic fuel and water, which are permeated through a fuel permeation-controlling member 56 from a fuel source through a feeding chamber or a plurality of feeding chambers (e.g., 58). This member is substantially impermeable to an organic fuel and/or water at or below an ambient temperature, but permeable to the organic fuel and/or water at a temperature higher than an activation temperature to deliver a permeated fuel fluid to the anodes. This member 56 may comprise a continuous membrane sheet that is divided into a plurality of fuel permeation zones 60, or separate sheets or zones comprising different permeation membrane materials or membranes of different thicknesses. Heating means are also provided to heat the member to a desired temperature. Heat can come from an electro-chemical reaction in the fuel cell, a heating element implemented at or near the member, or a combination of both.

Similarly, an equal number of cathodes 54 are bonded to the opposite side of the electrolyte membrane directly opposite the anodes. The cathodes are exposed to the air, and air flow is achieved preferably by natural convection (e.g., for portable devices) or by use of a low pressure fan, blower or pump (e.g., for vehicles). Edge current collection and wires or cell interconnects are used to connect the individual cells in electrical series. Alternatively, cells or groups of cells may be connected in parallel. In real practice, each proton exchange membrane sheet is coated on both sides with a catalyst to form a catalyst-coated membrane (CCM). The CCM layer is sandwiched between an anode backing layer (carbon paper or cloth) and a cathode backing layer (carbon paper or cloth). The resulting five-layer assembly is called a membrane electrode assembly (MEA) unit.

Referring again to FIG. 6 as an example, the planar fuel cell contains an MEA member 50 (containing individual MEA units coinciding with zones A', B', C', and D') that is sandwiched between a current collector assembly 64 and a fuel permeation-controlling member 56. The MEA member 50 in the planar fuel cell contains a plurality of anodes 52 disposed only on one side of the electrolyte sheet, and a plurality of cathodes 54 disposed only on the opposite side of the electrolyte sheet or PEM. The anodes and cathodes may contain or perform additional functions such as fuel vapor diffusion and water management, respectively. When a plurality of anodes and cathodes are used, they are typically disposed on the solid electrolyte sheet in an array format, with each of the electrodes arranged such that they are associated with corresponding current collectors (e.g., the cathode below Zone A' corresponds to a current collector at Zone A", etc.). This configuration maximizes the active area of the electrolyte, because unlike prior art stacked fuel cells, where significant area around the perimeter of every MEA is dedicated to sealing and mounting, and unlike prior art planar fuel cells, where significant area is consumed by the need to seal the electrical connections as they penetrate the PEM, only the perimeter of the MEA member is needed to effect the seal, and no electrical connections are made through the MEA member.

Figure 6:
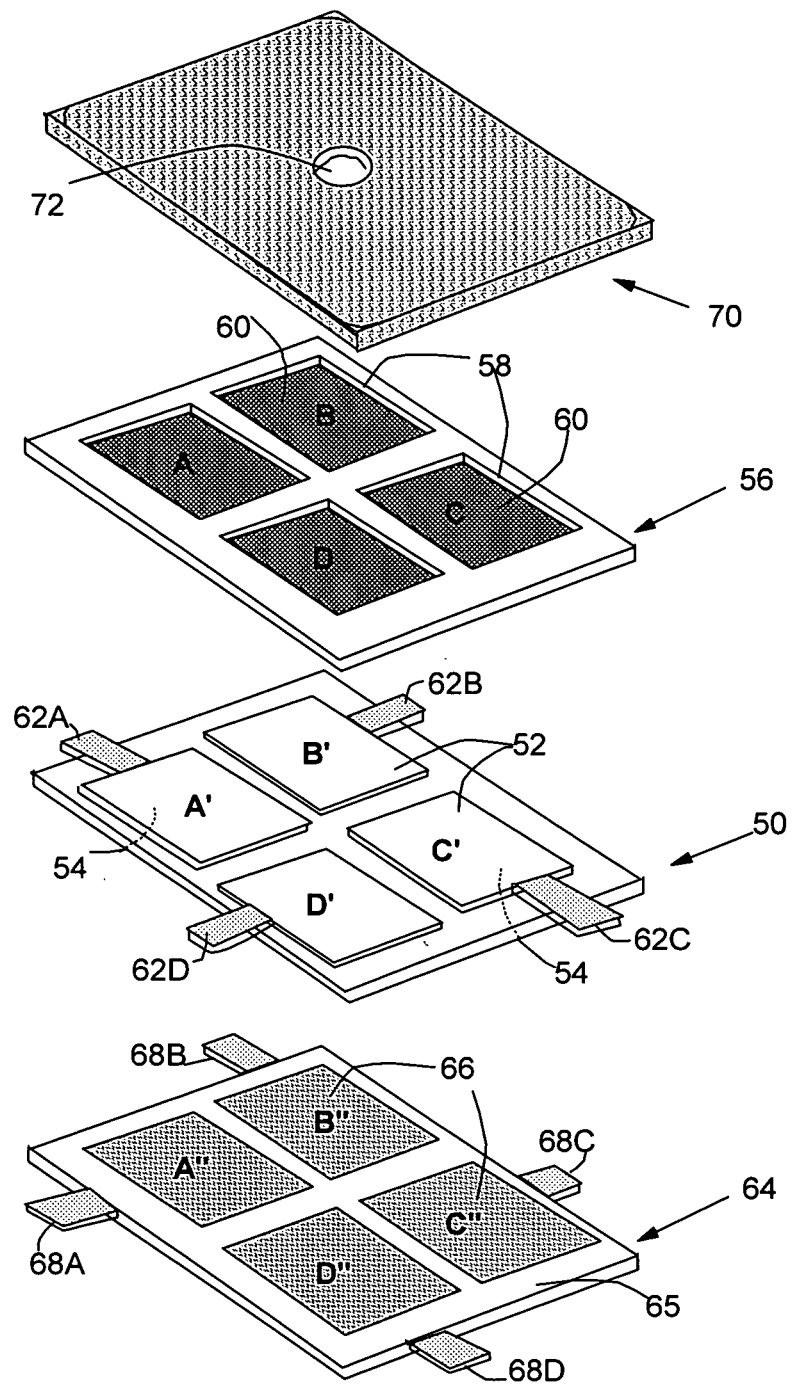
FIG. 6 An exploded isometric view (schematic) of a planar fuel cell in accordance with a preferred embodiment of the invention.

The current collector assembly 64 for the cathode side consists of an electrically insulating plastic frame 65 that contains a plurality of current collectors 66 embedded within the plastic frame. Each of the current collectors 66 has an interconnect means (e.g., 68A, 68B, 68C, 68B) appended thereto. As shown in FIG. 6, each anode (comprising preferably a carbon paper or cloth) has a tab (e.g., 62A, 62B, 62C, and 62B) connected thereto or integral therewith. A current collector like that 64 for the cathode side is not required. The interconnect means serves to make an electrical connection to the exterior of the fuel cell, and is electrically connected to the current collector 66. Although the drawing depicts the interconnect means (e.g. 68A) as a tab, it can assume a variety of configurations, for example, a wire, as will be readily discernible to one of ordinary skill in the art. In one preferred embodiment, the current collectors 66 can be insert molded into the plastic frame 65 with the interconnect means extending through the frame such that when the planar fuel cell is assembled, the current collector is within the perimeter of the MEA and the interconnect means is outside the perimeter of the MEA. One main advantage of this format is that the plastic frame 65 forms a gas tight integral seal around the interconnect means, thus eliminating the need to add other seals and/or gaskets. This novel approach provides for electrical connections between and within the fuel cell without traversing the thickness of the solid electrolyte sheet. No penetrations are made in the MEA, thus the solid electrolyte can be made in a single, continuous sheet, with all the anodes on one side and all the cathodes on the other side. There are no holes or apertures to seal, as in the prior art. This novel scheme allows the individual anodes and cathodes in each of the arrays to be placed very close together, thus utilizing a greater amount of the active area, as high as 95% of the total area of the current collector assembly. The individual anodes or cathodes can be spaced as close as 1 mm to each other.

A conventional planar fuel cell is typically composed of a membrane electrode assembly (MEA) sandwiched between two current collector assemblies. By contrast, in one embodiment of the present invention, no current collector assembly or only one assembly is needed, significantly reducing the bulkiness and complexity of the fuel cell system. The current collectors may be supported by a plastic frame, and they have an interconnect tab that provides an electrical pathway beyond the perimeter of the MEA. The interconnect tab can be connected to or integral with the corresponding anode or cathode. The interconnect tab is situated to provide electron transfer between the anodes and the cathodes such that preferably the interconnect tab does not traverse the thickness of the polymer electrolyte membrane. When the planar fuel cell is assembled, the interconnect tab is properly sealed to prevent leaking of fuel (e.g., organic fuel and water) or oxidant gases (e.g., oxygen or air).

Fuel is supplied in a mixture of organic fuel and water (like in a conventional planar fuel cell or a conventional DMFC stack), or in separate organic fuel and water feedstocks. Schematically shown in FIG. 6 is the former case where a mixture of organic fuel and water is fed or replenished through a hoe 72 of a casing member 70 and distributed into four fuel chambers 58, which direct the fuel to wet the four fuel permeation zones A, B, C, and D of a fuel permeation-controlling member 56. The fuel that permeates through zones A, B, C, and D enters the corresponding fuel diffusion layers (carbon paper, e.g.) of anodes in zones A', B', C', and D'. The electrons produced are collected through tabs 62A, 62B, 62C, and 62D, respectively. It may be noted that most of the membranes used in a permeation-controlling member exhibit differential permeation rates for water and methanol. If the permeation rate differences are not insignificant, the "retentate" (the material that does not permeate through and is retained in the feed chamber) will have a methanol-to-water ratio that varies with time. This could significantly impact the performance of a fuel cell. A methanol concentration sensor may be implemented to monitor the methanol concentration and a methanol or water source may be positioned to supply methanol or water to the fuel chamber on demand to maintain a constant methanol concentration.

Figure 7:
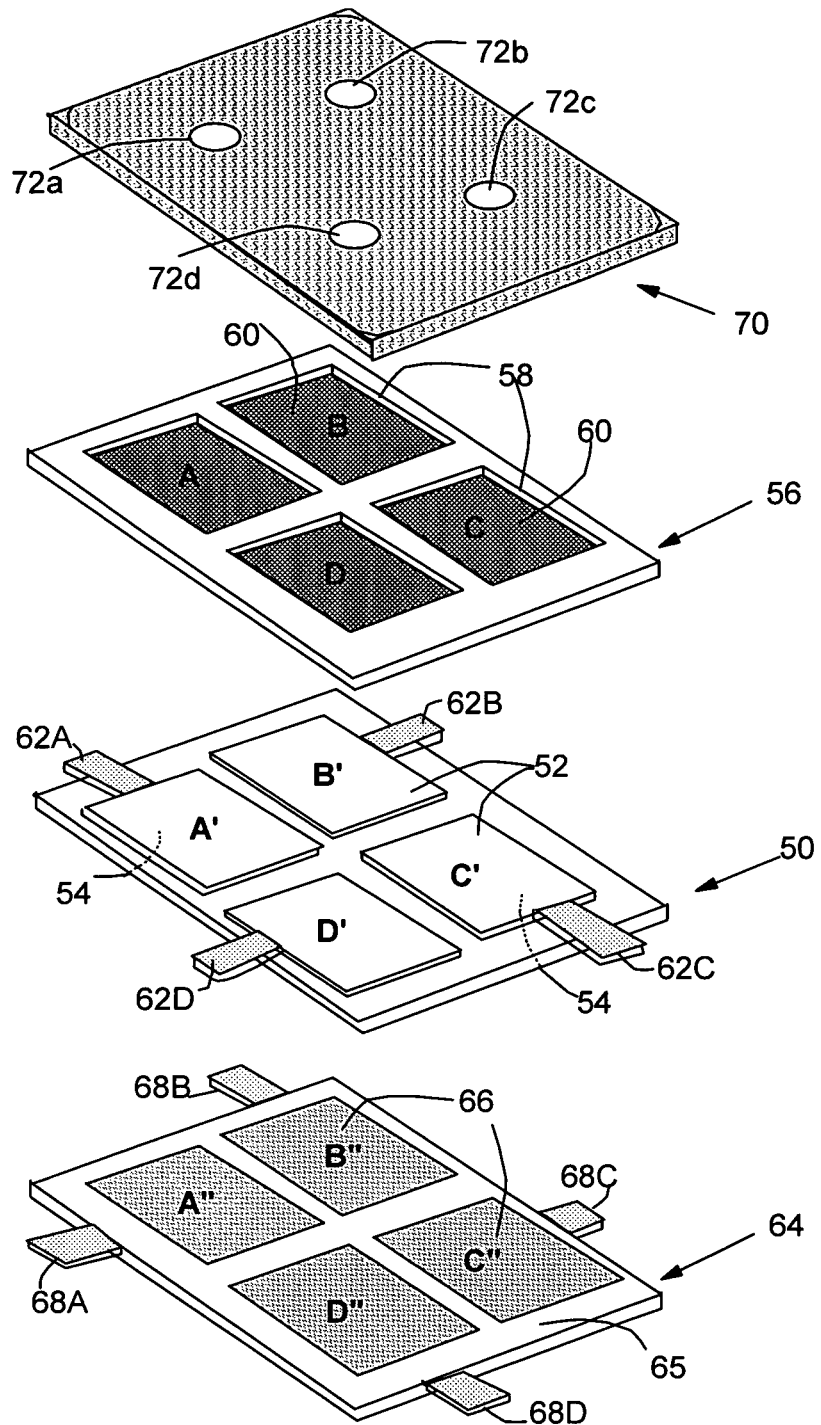
FIG. 7 An exploded isometric view (schematic) of a planar fuel cell in accordance with another preferred embodiment of the invention, wherein the organic fuel and water are separately permeated through different zones of the fuel permeation-controlling membrane.

Alternatively, as schematically shown in FIG. 7, the organic fuel and water can be fed from different fuel sources into different fuel chambers. No methanol (organic) sensor is required. When the organic fuel level or water level is low, just add the organic fuel or water to its respective fuel chamber. For instance, water is fed through holes 72a and 72c into zones A and C only (not zones B and D) and methanol is fed through holes 72b and 72d into zones B and D only (not zones A and C). The permeated water and methanol vapors are directed to uniformly mix together prior to reaching the anode catalyst layers through the anode diffusion layers. If necessary, a vapor mixing chamber may be positioned between the fuel permeation-controlling member 56 and the anodes 52 to ensure thorough mixing of the two vapors. The fuel vapor mixtures that are delivered to zones A', B', C', and D' should be substantially uniform in composition. Water and organic fuel (e.g., methanol) are fed from two source tanks to come in contact with different zones of the fuel permeation-controlling member. There can be eight or sixteen zones (instead of four) to facilitate easier mixing of water and methanol vapors. Other more sophisticated mixing strategies of methanol and water permeation zones can be followed to ensure a uniform mixing of methanol and water vapors. These different zones of the member can be different fuel permeation membranes or the same types of membrane with different thicknesses or surface functional treatments to ensure that the two fuel components (water and methanol) permeate through the member at desired rates. Once permeated, the two fuel species are mixed and diffused through anodes for oxidation to produce protons and electrons. In any case, the fuel is distributed to only one side of the membrane electrode assembly member 50 and oxidant is distributed only to the other side.

Conventional co-planar fuel cells are typically used for low power applications and operate at relatively low temperatures, generally below 60° C. By contrast, the presently invented planar fuel cell is normally operated at a higher temperature, generating much more power due to lower fuel cross-over, higher electro-catalytic activities, lower polarization, etc. It should be understood that, although the preferred operation of the fuel cell of the present invention is to have liquid organic fuel contact the fuel permeation-controlling member, the organic fuel contacting the permeation-controlling member could alternatively be in the vapor state or in a liquid/vapor state.

Another preferred embodiment of the present invention is another planar fuel cell system that is similar to FIG. 7 in configuration, but having a vapor-generating membrane that is impermeable to an organic or water in liquid form. Yet, this membrane is permeable to the organic or water in vapor form, or is capable of absorbing the organic and water in liquid form and releasing either or both in vapor form. In addition, a vapor mixing and diffusion member is positioned between the vapor-generating member and anodes. This planar fuel cell system comprises: (a) a membrane electrode assembly, comprising one solid electrolyte sheet having a plurality of anodes disposed on only one major side of the solid electrolyte sheet and a plurality of corresponding cathodes disposed on only an opposing major side of the solid electrolyte sheet; (b) a vapor mixing and diffusion member positioned in front of the anodes; (c) a vapor-generating member positioned in front of the vapor mixing and diffusion member with the vapor-generating member comprising a plurality of membrane zones being substantially impermeable to an organic fuel and/or water in a liquid phase but being permeable to or capable of releasing the organic fuel or water in a vapor phase; (d) fuel supply means comprising a plurality of fuel-feeding chambers corresponding to the plurality of membrane zones and feeding a fuel thereto, wherein the feeding fuel in a first of the chambers differs in composition from the feeding fuel in a second of the chambers; and (e) a plurality of current collectors each having an interconnect means with each of the plurality of anodes or each of the plurality of cathodes having one of the plurality of current collectors associated therewith and the interconnect means being arranged to provide electron transfer between anodes and cathodes. The solid electrolyte sheet can be a continuous film that covers all the areas sandwiched between all pairs of anodes and cathodes. Alternatively, each pair of anode and cathode can have its own solid electrolyte film and, hence, there are multiple films of electrolyte in a planar fuel cell system.

This is another planar fuel cell system featuring multiple fuel-feeding chambers. Preferably, one of the feeding chambers feeds neat organic fuel and another one feeds pure water to the vapor-generating member. The two streams of vapor are mixed well before or during their diffusion to the anode catalysts.

It should also be understood that the fuel cells of the present invention could alternatively be operated so that pure $H_2$ or a value-added organic product is generated at the cathode, instead of water. This may be done by electrochemically oxidizing the fuel at the anode to form protons, electrons and $CO_2$ and then by providing an electrical current to the electrochemical cell to pump the protons through the proton exchange membrane and the electrons through an external circuit to the cathode of the cell, where the protons are reduced in the absence of oxygen to form gaseous $H_2$ or, alternatively, are reacted with a reducible species to produce a hydrogen-containing species.

EXAMPLE 1

Polyurethane-Based Permeation-Controlling Membrane

Polyurethane (PU) membranes were prepared by the reaction of toluene-2,4-diisocyanate with hydroxy-terminated oligomers. Oligomers were either liquid polybutadiene (MW 3000) or propylene oxide-based polyethers (MW 420 and 4800). The prepared membranes were used in pervaporation of binary mixtures of water/ethanol and water/methanol. Polyurethanes with linking segments formed predominantly by high-molecular-weight oligomers (MW 3000 or 4800) were rubbery materials with a glass transition temperature (Tg) lower than room temperature. By contrast, hard glassy membranes (Tg>room temperature) were obtained if the linking segments comprised high amounts of a polyether with MW 420. When a fuel mixture was fed to one side of a glassy PU membrane, only small molecules of the feed mixture permeated through at an appreciable rate at a T<Tg. At a temperature>Tg, all glassy PU membranes allowed for permeation of ethanol and methanol at reasonable rates. In the cases of rubbery PU membranes, where one of the feed components had a high affinity to the linking segments, the membrane preferentially transported this component.

EXAMPLE 2

Poly(vinyl Alcohol)-Based Permeation-Controlling Membrane

Poly(vinyl alcohol) (PVA) can be modified to obtain phosphatic anionic PVA (P-PVA) and quaternary ammonium cationic PVA (C-PVA) with various degrees of substitution (D.S.). The polyelectrolyte complex membrane prepared by mixing P-PVA (D.S.=2.3%) and C-PVA (D.S.=2.9%) with weight ratio of 1/1, showed a permeation rate of 378 g/m²h and separation factor of 2,250 for dehydration (water permeation) of an ethanol/water mixture (ethanol 95.4 wt %) at a feed temperature of 75° C. The water removal rate is significantly lower at 25° C.

Additionally, cross-linked PVA membrane was prepared with poly (acrylic acid-co-maleic anhydride) (PAAM) serving as a polymeric cross-linking agent. Cross-linked membranes were characterized by water swelling and methanol permeability. Swelling ratio decreased with increasing cross-linking agent content since the swelling of water molecule is restricted by chemical cross-linking between PVA chains and polymeric cross-linking agent chains and physical cross-linking by entanglement between the chains. When the contents of cross-linking agent increased, separation factor increased and permeation flux decreased for the pervaporation of aqueous ethanol solution through the membrane. The separation factor slightly decreased and permeation flux increased with increasing feed water content in feed solution and plasticization effect by the water molecules was not observed. Cross-linked PVA was found to be particularly suitable for use as a permeation-controlling member. At temperatures lower than 75° C. (slightly lower than its glass transition range of 80-85° C.), both water and methanol permeation rates were low. Both rates were significantly higher when the member temperature was higher than 85° C.

Poly(vinyl alcohol)(PVA)/poly(acrylic acid)(PAA) and PVA/sulfosuccinic acid (SSA) membrane performances have also been studied for the pervaporation separation of water/methanol (MeOH) mixtures with varying operating temperatures, amount of cross-linking agents, and feed compositions. Typically, a separation factor of about 1500 and a permeation rate of 10.1 g/m²/h were obtained with PVA/PAA=85/15 membrane for Water/MeOH=80/20 mixtures at 50° C. For PVA/PAA membranes, the flux was affected by the structural changes of the membranes due to the cross-linking and the free carboxylic acid group also played an important role in the separation characteristics through the hydrogen bonding with PVA and the feed components leading to the increase of flux. The latter membrane of the 5% SSA membrane shows the highest separation factor of 2095 with the flux of 12.79 g/m²/h for water/MeOH=80/20 mixtures at 30° C.

EXAMPLE 3

Methanol Selective Permeation Membranes

Polymeric membranes with excellent chemical resistance were prepared from polar polymers including NBR (Acrylonitrile-Butadiene Rubber) and Poly (vinyl chloride). These materials were cross-linked to form chemically and mechanically robust membrane materials, which were all more permeable to methanol than water. The permeation rates were negligible at room temperature, but become appreciable at 60° C. or higher.

The pervaporation performance of a polymer blend membrane made from cellulose acetate and cellulose acetate hydrogen phthalate was also studied. All the tested membranes were found to permeate methanol preferentially. The selectivity increases and the permeation rate decreases with increasing cellulose acetate content in the blend. When the feed temperature or the methanol content in the feed increases, the permeation rates of a membrane with a 30 wt % in cellulose acetate are greatly enhanced and the selectivity decreases. However, the temperature effect is more significant at low methanol content in the feed and becomes negligible at high methanol content in the feed where plasticity effects prevail. This blend was particularly useful for separate permeation control of water and methanol fuel, fed to different zones of the permeation-controlling membrane at 45-100° C. Different zones could have different cellulose acetate contents, or the same content but different thicknesses.

EXAMPLE 4

Ceramic-Supported Membranes

Ceramic-supported polymer pervaporation membranes can be prepared through surface modification of a ceramic support membrane by a graft-polymerization procedure. One useful procedure consists of silylation of surface hydroxyls, which provides the anchoring sites for the grafted chains, followed by a free radical graft polymerization reaction. This procedure allows for the attachment of either hydrophilic or hydrophobic polymers. For pervaporation applications, the chemically attached polymer phase serves to allow permeation of the selected compound while preventing others from passing through the membrane. Poly(vinyl pyrrolidone) (PVP) and poly (vinyl acetate) (PVAc) were grafted to porous silica substrate to obtain PVAc-silica and PVP-silica membranes, respectively. Both were found to be effective in resisting permeation of water, allowing preferential permeation of organics, including both ethanol and methanol. The mass transfer process appears to be controlled essentially by the boundary layer near the membrane surface. This boundary layer comprises the attached functional polymers that are more affine to one selected target permeating species (e.g., methanol) than others (e.g., water).

EXAMPLE 5

Amorphous PTFE

A novel membrane material for target organic-organic pervaporation is amorphous Teflon 2400 or random copolymer of 87 mol % of 2,2-bis-trifluoromethyl-4,5-difluoro-1,3-dioxole and 13 mol % of tetrafluoroethylene (DuPont Co), having the structure:

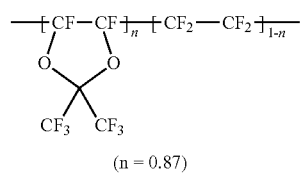

(n = 0.87)

This material is known by its high gas permeability. However, it was still surprising to observe that this material was quite permeable to methanol at T=80° C. or above, even though its Tg is higher than 160° C. This is presumably due to its large free volume. It is also of interest to observe that the permeability of this material to both water and methanol at room temperature is minimal. Preliminary study of pervaporation of individual organic compounds through the films of this material indicated that transport in this polymer is governed by mobility (diffusivity) selectivity. In addition, it is insoluble in all organic solvents except perfluorinated liquids and, hence, makes a stable and robust permeation-controlling material.

EXAMPLE 6

Permeation-Controlling Membranes from Thermally Stable Polymers

For high temperature applications (100° C.-150° C., or higher), sulfonated versions of thermally stable polymers are particularly useful. Examples are sulfonated poly (ether ether ketone) (S-PEEK) and sulfonated poly ethersulfone (S-PES) that exhibit relatively high permeability to both water and methanol, although unsolfonated PEEK and PES are essentially impermeable to both water and methanol. At room temperature, the permeation rates of both water and methanol are low (hence very little parasitic loss when the fuel cell is not in operation), but become appreciable at 60° C. and relatively high at 100° C. These rates were found to be sufficient to sustain a steady operation of presently invented fuel cells.

FIG. 8(A) and FIG. 8(B) show the output voltage and power, respectively, of four methanol-water fuel cells fabricated in accordance with the present invention. S-PEEK was used as both the fuel permeation-controlling membrane and the proton exchange membrane. These data clearly demonstrated the superior performance of the presently invented organic vapor fuel cells when operated at a relatively high temperature. The extra power generated (due to much improved fuel utilization efficiency, reduced fuel cross-over, greater electro-catalytic activities, and lesser polarization), has more than compensated for the required heating to sustain a high operating temperature. At 120° C., less than 3% of the generated power was used for auxiliary heating.

EXAMPLE 7

Permeation of Methanol-Water Mixture Versus Separate Permeation of Water and Methanol Shown in FIG. 9 are two voltage-current density curves for two comparable fuel cell units, respectively, operating at 65° C. Both units used Nafion®-112 as both fuel permeation-controlling membrane and proton exchange membrane. One fuel cell comprised one fuel feeding chamber containing a mixture of methanol (50% by volume) and water (Curve A). The other fuel cell comprised two chambers that separately fed neat methanol and water to the fuel permeation-controlling member (Curve B). The experiments were allowed to proceed slowly from low current density to high current density values. As time elapsed, the methanol concentration of the methanol-water mixture increased, suggesting that methanol and water permeated through the permeation-controlling Nafion membrane at different rates. This phenomenon by itself might not be expected to be so detrimental to the fuel cell operation. However, on a separate experiment, it was found that the methanol-water ratio actually varied significantly with time, implying that both water and methanol permeation rates were highly concentration-dependent. When the feed ratio on the source side varied, the permeated water-to-methanol ratio also varied accordingly, eventually leading to an unstable or poor performance of the fuel cell containing a methanol-water mixture in the feed chamber. The fuel cell with separate water and methanol feeds clearly exhibited a better performance. This was a surprising and non-obvious result.

It may be noted that, although the examples given herein are based on the methanol-water mixture as the liquid fuel, the presently invented fuel cell is not limited to this particular type of fuel. The present fuel cell can operate on any organic fuel that has a high hydrogen content (e.g., ethanol and propanol) and can be fed in a liquid form into the fuel chamber and then converted to become a vapor prior to reaching the anode catalyst phase.

The invention claimed is:

1. An organic vapor fuel cell comprising:
(a) a membrane electrode assembly, comprising (i) a proton exchange membrane having a front face and a rear face, (ii) an anode being coupled to said front face with said front face and said anode defining an interface to accommodate an anode electro-catalyst therein, and (iii) a cathode being coupled to said rear face with said rear face and said cathode defining an interface to accommodate a cathode electro-catalyst therein;
(b) a fuel permeation-controlling member positioned in front of said anode, said member being substantially impermeable to an organic fuel and/or water at or below an ambient temperature, but being permeable to said organic fuel and/or water at a temperature higher than an activation temperature to deliver a permeated fuel fluid to said anode;
(c) heating means in heat-supplying relation to said fuel permeation-controlling member to activate fuel permeation through said member on demand, wherein said heating means comprises receiving heat produced by an electrochemical reaction of the fuel cell or receiving heat from joule heating by passing a current through a heating element implemented in the fuel cell; and
(d) fuel supply means to accommodate said organic fuel and water as a mixture at a first organic-to-water ratio, and provide said organic fuel and water as a feeding fuel to said permeation-controlling member and said permeated fuel fluid is at a second organic-to-water ratio, which is lower than said first organic-to-water ratio; wherein said fuel supply means comprises (i) fuel flow channels in flow communication with said fuel permeation-controlling member and (ii) a liquid fuel source in supplying relation to said fuel flow channels and wherein said fuel cell operates to supply additional heat to vaporize more fuel on demand.

2. The fuel cell according to claim 1, wherein said fuel flow channels comprise a porous fuel-permeating material in flow communication with said liquid fuel source.

3. The fuel cell according to claim 2, wherein said fuel-permeating material exhibits a capillary phenomenon, and is configured to receive said liquid fuel from said source by a capillary force.

4. The fuel cell according to claim 3, wherein the porous fuel-permeating material is selected from porous materials, cottons, papers, non-woven fabrics, or woven fabrics which produce a capillary action.

5. The fuel cell according to claim 4, wherein the porous material has a pore volume of 20 to 90% and a pore diameter of 0.01 to 150 µm.

6. The fuel cell according to claim 1, wherein said fuel permeation-controlling member is selected from the group consisting of a pervaporation membrane, vapor-permeating membrane, micro-filtration or ultra-filtration membrane, polymer containing an amorphous phase, ceramic-supported polymer membrane, composite membrane, and combinations thereof.

7. The fuel cell according to claim 1, further comprising (e) means for electrically interconnecting said anode and said cathode through an external load.

8. The fuel cell according to claim 1, wherein said fuel supply means comprises multiple separate chambers to accommodate said organic fuel and water.

9. The fuel cell according to claim 8, wherein said fuel permeation-controlling member comprises multiple fuel permeation zones.

10. The fuel cell according to claim 9, wherein a first chamber accommodates said organic fuel wetting a surface of a first fuel permeation zone and permeating therethrough when heated above an activation temperature, and a second chamber accommodates water wetting a surface of a second fuel permeation zone and permeating therethrough when heated above an activation temperature.

11. The fuel cell according to claim 1, further comprising a temperature sensor to monitor the temperature of said fuel permeation-controlling member.

12. The fuel cell according to claim 11, further comprising a temperature control device to regulate the temperature of said member.

13. The fuel cell according to claim 1, further comprising a tab being connected to or integral with said anode to serve as a negative terminal for transferring the electrons generated by the fuel cell.

14. The fuel cell according to claim 1, further comprising a supporting conductive layer being disposed between said anode and said fuel permeation-controlling member; said conductive layer having a tab to serve as a negative terminal.

15. The fuel cell according to claim 14, wherein said supporting conductive layer is selected from the group consisting of a metallic screen, a porous metal sheet, a sheet of carbon foam, paper or felt, a perforated carbon plate, a sheet of carbon composite, and combinations thereof.

16. The fuel cell according to claim 1, wherein said organic fuel is selected from methanol, ethanol, propanol, isopropanol, trimethoxymethane, dimethoxymethane, dimethyl ether, trioxane, formaldehyde, formic acid, or a combination thereof.

17. The fuel cell according to claim 1, wherein said heating means comprises using a rechargeable battery to provide initial heating to begin a fuel cell operation.

18. The fuel cell according to claim 1, wherein said heating means comprises feeding a fraction of the current generated by said fuel cell to said heating element.

19. A plurality of electrically connected fuel cells, at least one of said fuel cells being a fuel cell as defined in claim 1.

20. The plurality of electrically connected fuel cells as defined in claim 19, wherein said fuel cells are connected in parallel.

21. The plurality of electrically connected fuel cells as defined in claim 19 wherein said fuel cells are connected in series.

22. An organic vapor fuel cell comprising:
(a) a membrane electrode assembly, comprising (i) a proton exchange membrane having a front face and a rear face, (ii) an anode being coupled to said front face with said front face and said anode defining an interface to accommodate an anode electro-catalyst therein, and (iii) a cathode being coupled to said rear face with said rear face and said cathode defining an interface to accommodate a cathode electro-catalyst therein;
(b) a fuel permeation-controlling member positioned in front of said anode, said member being substantially impermeable to an organic fuel and/or water at or below an ambient temperature, but being permeable to said organic fuel and/or water at a temperature higher than an activation temperature to deliver a permeated fuel fluid to said anode;
(c) heating means in heat-supplying relation to said fuel permeation-controlling member to activate fuel permeation through said member on demand, wherein said heating means comprises receiving heat produced by an electrochemical reaction of the fuel cell or receiving heat from joule heating by passing a current through a heating element implemented in the fuel cell; and
(d) fuel supply means to accommodate said organic fuel and water as a mixture at a first organic-to-water ratio, and provide said organic fuel and water as a feeding fuel to said permeation-controlling member and said permeated fuel fluid is at a second organic-to-water ratio, which is different than said first organic-to-water ratio; wherein said fuel supply means comprises (i) fuel flow channels in flow communication with said fuel permeation-controlling member and (ii) a liquid fuel source in supplying relation to said fuel flow channels and wherein said fuel cell operates to supply additional heat to vaporize more fuel on demand.

23. The fuel cell according to claim 22, wherein said organic fuel is methanol and said second ratio is approximately one-to-one on a molecular basis.

* * * * *